(12) United States Patent
Sukhman et al.

(10) Patent No.: US 7,715,454 B2
(45) Date of Patent: May 11, 2010

(54) METHOD AND APPARATUS FOR COOLING A LASER

(75) Inventors: Yefim Sukhman, Scottsdale, AZ (US); Christian J. Risser, Scottsdale, AZ (US); Stefano J. Noto, Mesa, AZ (US); Mikhail E. Ryskin, Phoenix, AZ (US); Walter D. Bilida, Scottsdale, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 7 days.

(21) Appl. No.: 10/788,642

(22) Filed: Feb. 27, 2004

(65) Prior Publication Data

US 2005/0123011 A1    Jun. 9, 2005

Related U.S. Application Data

(60) Provisional application No. 60/527,221, filed on Dec. 4, 2003.

(51) Int. Cl.
 *H01S 3/04* (2006.01)
(52) U.S. Cl. ........................................................ 372/34
(58) Field of Classification Search .................. 372/34, 372/57, 58
See application file for complete search history.

(56) References Cited

U.S. PATENT DOCUMENTS

| | | | | |
|---|---|---|---|---|
| 4,805,177 A | * | 2/1989 | Martin et al. | 372/34 |
| 4,953,176 A | * | 8/1990 | Ekstrand | 372/107 |
| 5,253,261 A | * | 10/1993 | Chaffee | 372/34 |
| 5,550,853 A | * | 8/1996 | Ostler | 372/34 |
| 5,894,493 A | | 4/1999 | Sukhman et al. | |
| 5,901,167 A | * | 5/1999 | Sukhman et al. | 372/58 |
| 6,251,102 B1 | * | 6/2001 | Gruzdev et al. | 606/10 |
| 6,813,289 B2 | * | 11/2004 | Gruzdev et al. | 372/34 |
| 7,415,051 B1 | | 8/2008 | Risser et al. | |
| 2003/0021312 A1 | * | 1/2003 | Gruzdev et al. | 372/39 |
| 2003/0227954 A1 | * | 12/2003 | Ariga et al. | 372/55 |

\* cited by examiner

*Primary Examiner*—Minsun Harvey
*Assistant Examiner*—Delma R Forde
(74) *Attorney, Agent, or Firm*—Perkins Coie LLP

(57) ABSTRACT

A laser includes a laser source and an power source arranged such that both components have substantially the same cross-section, with cooling fins arranged axially along the length of each element. The components are arranged end-to-end in a series to form an assembly with substantially the same cross-section along the entire length of the assembly. A shroud mounted along the assembly forms a single air channel directing air from a fan along the entire length of the assembly, for cooling both the power source and the laser source with the total air flow from the at least one fan. The laser source and the power source are arranged in series such that the laser source is cooled first, and the subsequent air flow, although slightly warmer from cooling the laser source, is sufficient to cool the power source.

23 Claims, 5 Drawing Sheets

METHOD AND APPARATUS FOR COOLING A LASER

CROSS-REFERENCE TO RELATED APPLICATIONS

This application claims priority to U.S. provisional patent application No. 60/527,221, filed on Dec. 4, 2003, the disclosure of which is incorporated herein and is made a part of the present application.

BACKGROUND OF THE INVENTION

1. Field of the Invention

This invention relates to lasers, and in particular to a method and apparatus for cooling a laser.

2. Description of the Related Art

Lasers and their components generate heat during operation, and so require cooling to prevent overheating and to extend the operational life of the laser. One known method of cooling a laser involves passing one or more streams of flowing air from a fan over the components.

Traditionally, sealed-off air-cooled gas lasers have used a split configuration with the laser source and a radio frequency (RF) power source separated into two assemblies connected by cables. In some prior art systems, each component employs its own cooling fan. In other lasers, users have been required to integrate laser components with separately provided cooling fans. For example, one laser introduced by the Synrad Corporation includes a sealed-off air cooled gas laser, marketed as the Series 48 models, which integrates a RF power source with a laser source by mounting the RF power source on the side of and along the entire length of the laser source. However, such Synrad lasers have not been supplied with cooling fans, but instead it was the responsibility of the user to obtain and integrate cooling fans with the laser, thus increasing costs and complexity in assembly.

In other lasers, at least one RF power source and at least one air cooling fan have been integrated with a laser source. For example, a method for cooling a gas laser is described in commonly-assigned U.S. Pat. No. 5,901,167, which is incorporated herein by reference and is made a part of the present application. In the U.S. Pat. No. 5,901,167, air flow from one or more fans 12 is split into two cooling air paths 14, 16, for example, illustrated by a prior art laser 10 shown in FIG. 1. Referring to FIG. 1, one path 14 provides flowing air to cool a RF power source which provides power to the laser source, and a second path 16 cools the laser source directly.

These paths may be designed to split the air flows in any desired ratio. For example, 50% of the flow may be split to a first path, and 50% to a second path; or alternatively 70% of the flow may be split to the first path, and 30% to the second path.

Methods known in the art for cooling lasers work well, but such methods include a number of drawbacks. For example, the splitting of the air flow between at least two components or into at least two paths provides less air flow to cool each of the components. In addition, the air flow, and therefore the cooling, is typically not symmetric, which causes undesirable deformations such as twisting or bowing of the laser source, thus causing optical misalignment of the laser source. For example, as shown in FIG. 1, air flow must turn about ninety degrees in order to travel through the fins of the laser source, and so more air tends to flow through the fins at the base of the laser source farthest from the fan than through the fins closer to the fan.

Furthermore, prior art lasers with such multiple air flows as shown in FIG. 1, for example, have an arrangement of components which does not lend itself to the most compact packaging. Accordingly, such lasers with cooling fans may be bulky.

Other known lasers with split air flow are described in U.S. Pat. No. 5,550,853 and also in commonly-assigned U.S. Pat. No. 5,894,493, which are incorporated herein by reference and are made a part of the present application.

We have invented a laser in which air flow from at least one fan cools a laser source and an RF power source in series, thus avoiding the disadvantages of splitting the air flow between such components.

BRIEF SUMMARY OF THE INVENTION

A sealed-off gas laser includes a laser source including a sealed-off housing containing a gas mixture, electrodes for exciting the gas mixture, optical elements positioned to form a resonator within the gas mixture, and an RF power source external to the laser source containing the gas mixture, with the RF source being connected to the electrodes within the gas mixture through sealed and electrically-insulated electrical feeds. The sealed-off gas laser source and the RF power source are arranged such that both components have substantially the same cross-section, with cooling fins arranged axially along the length of each element. The two elements may then be arranged end-to-end in a series to form an assembly with substantially the same cross-section along the entire length of the assembly.

A shroud mounted along the assembly forms a single air channel directing air from at least one fan along the entire length of the assembly, thereby cooling both the RF power source and the laser source with the total air flow from the at least one fan. The at least one fan may be mounted in such a way as to pull air through the assembly, or alternatively to push air through the assembly, depending on a desired arrangement selected from either cooling the laser source first and then cooling the power source, or cooling the power source first and then cooling the laser source.

In a preferred embodiment, the laser and the power source are arranged in series such that the laser source is cooled first, and the subsequent air flow, although slightly warmer from cooling the laser source, is sufficient to cool the power source.

One advantage of the arrangement of the laser source and power source in series is that all of the air flow from at least one fan is provided to cool both the laser source and the power source as opposed to splitting the air between these components.

Another advantage is that the air flow is symmetric, and therefore the cooling is symmetric, and so the present invention reduces or eliminates undesirable deformations such as the twisting or bowing of the laser source which may cause optical misalignment of the laser source.

A further advantage of the present invention is that the overall assembly, including the laser source, the RF power source, and the at least one fan, provides a more compact, if not the most compact, packaging arrangement for the overall laser.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
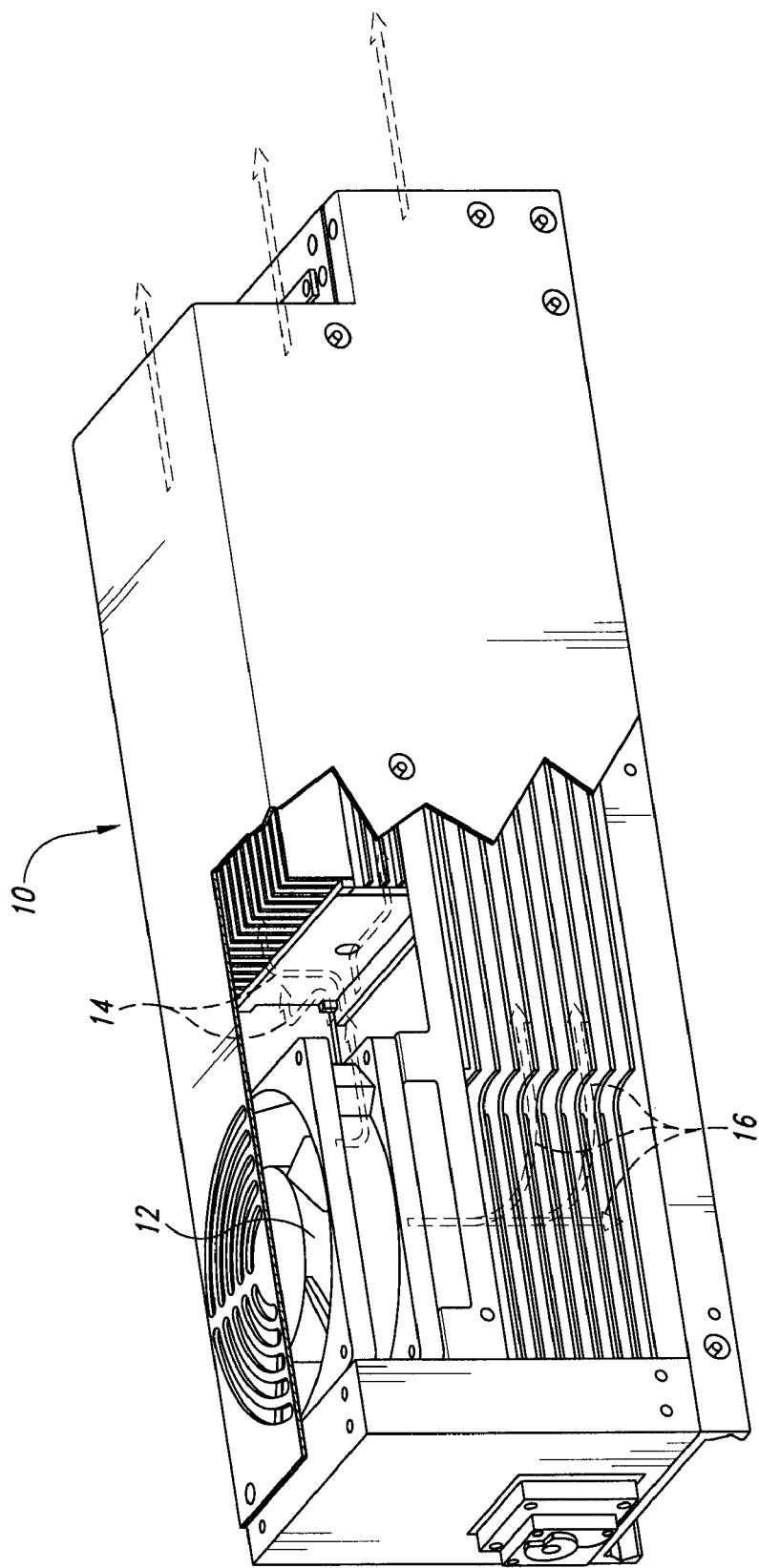
FIG. 1 is a top rear side perspective view of a laser in the prior art.
Figure 2:
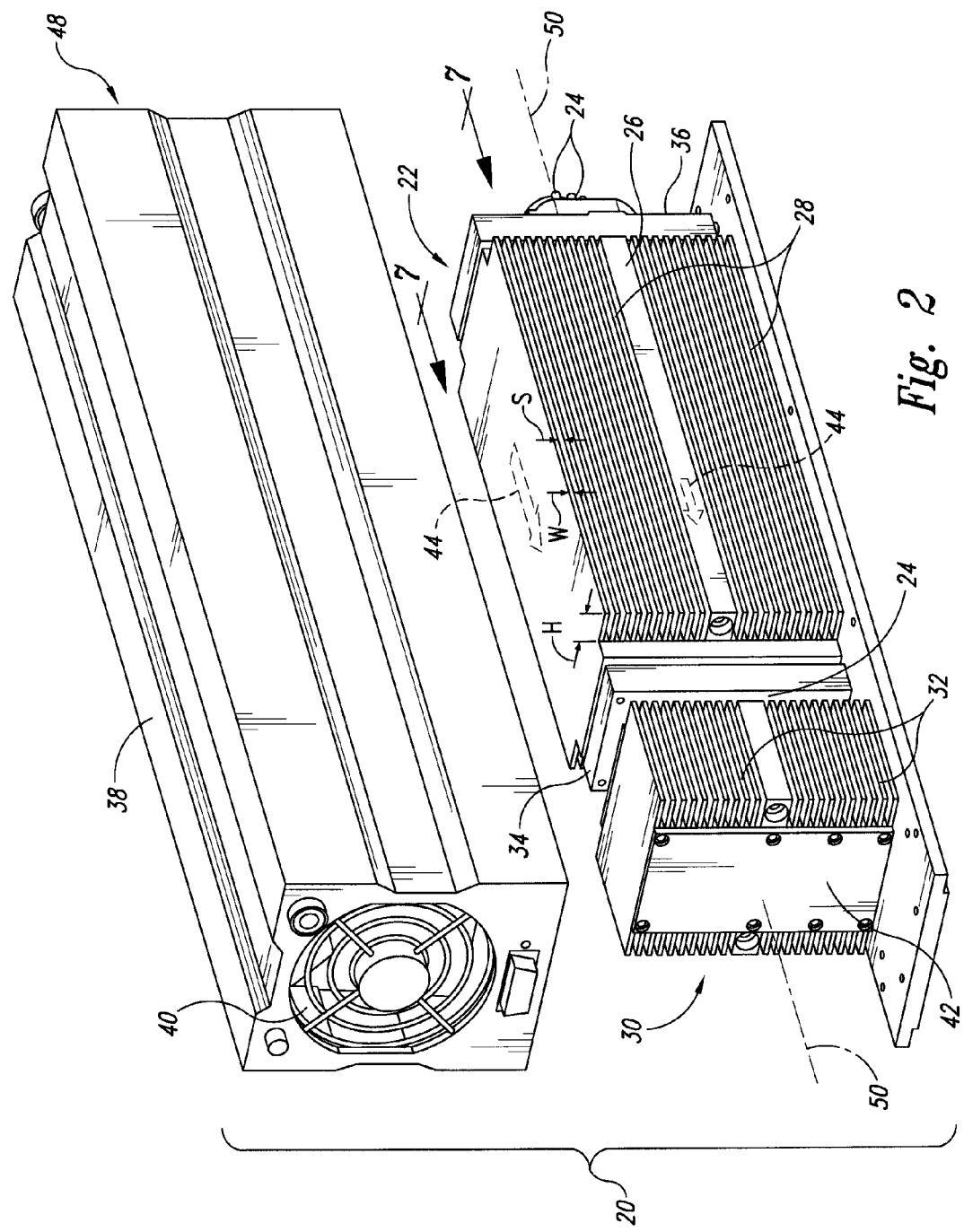
FIG. 2 is a top rear side perspective view of a laser of the present invention with parts separated.
Figure 3:
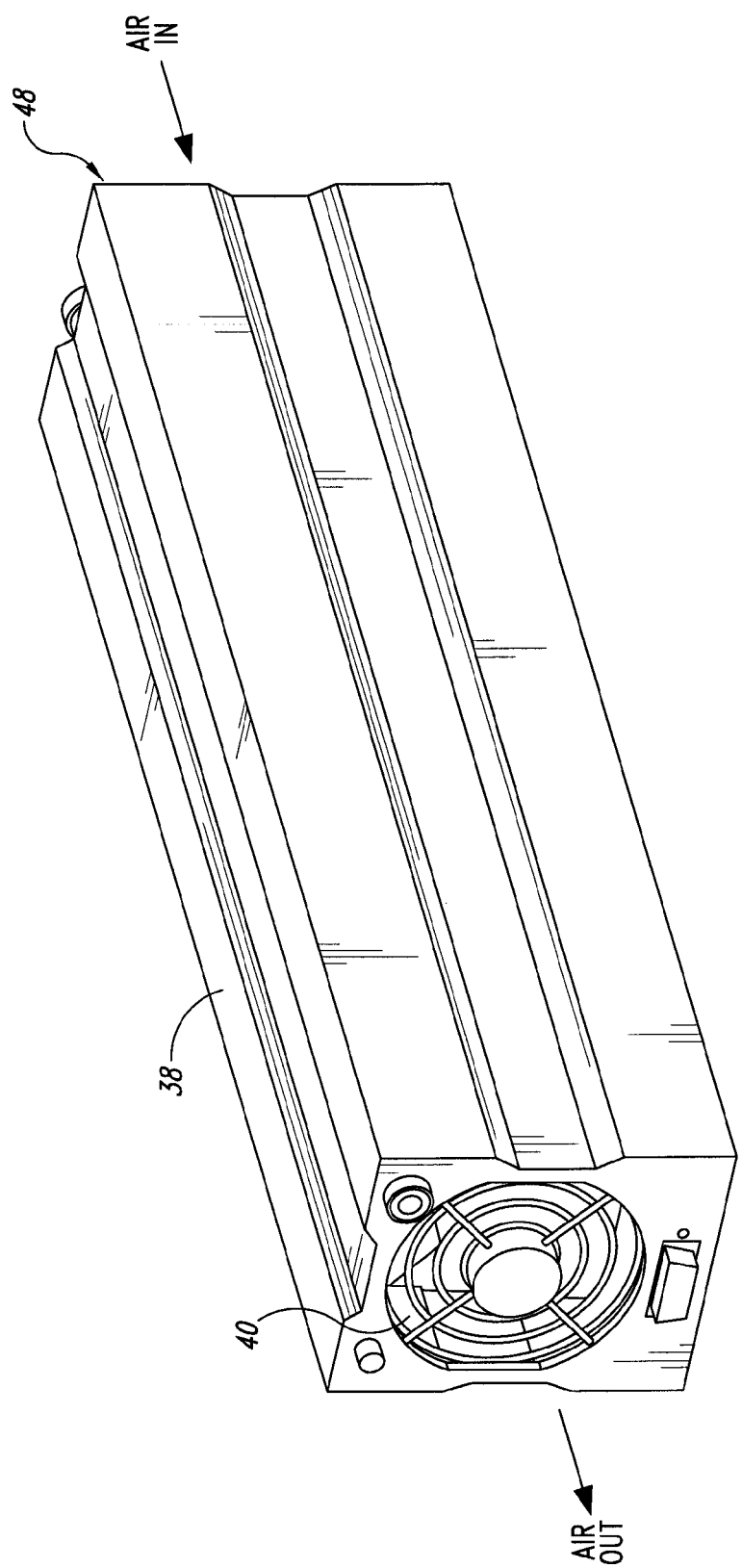
FIG. 3 is a top rear side perspective view of the laser of FIG. 2 in an assembled state.
Figure 4:
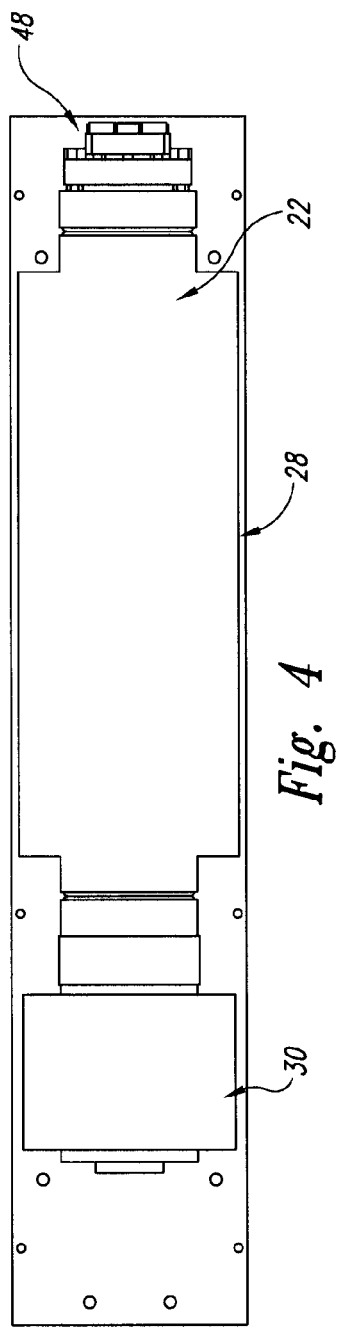
FIG. 4 is a top plan view of the laser of FIG. 2 with a shroud removed, showing a first method of profiling the cooling fins of the laser source.

Referring now to FIGS. 2-4, a laser 20 of the present invention includes a laser source 22 including a sealed laser tube 26 containing, for example, a gas mixture as a laser media, and electrodes therein provided as a means of exciting the laser media. As shown in FIG. 2, optical elements 24 are arranged at either end of the tube 26 forming a laser resonator, and cooling fins 28 are arranged on an exterior surface of the laser tube 26 and extend along the length of the laser tube 26 forming a substantially developed surface for removing heat from the laser source 22. By "developed surface", we refer to the combined usable cooling surface areas of all of the fins which comprise a heat sink on the external surface of the laser source 22.

However, alternative means for creating a "developed surface" known to persons skilled in the art are also contemplated. For example, alternatively shaped fins may be incorporated, and secondary fins attached to primary fins using alternative shapes may also be used. In such heat sinks, formed by a plurality of fins, the efficiency of the heat sinks is directly dependent on the height "H", width "W", spacing "S", and number of the fins, as shown in greater detail in FIG. 7.

An RF power source 30 is mounted end-to-end in a series arrangement with the laser source 22 along longitudinal axis 50 of the laser 20, with the RF power source 30 located at an end 34 of the laser source 22 opposite to the end 36 from which the laser beam emerges during laser operation.

The RF power source 30 has substantially the same cross-sectional area perpendicular to the longitudinal axis 50 as the laser source 22, thus enhancing and maintaining the uniformity and symmetry of the air flow 44. Cooling fins 32 are located on an exterior surface of the RF power source 30, and the cooling fins 32 extend along the length of the RF power source 30.

A shroud 38 is shown in FIGS. 2-3 which surrounds the assembly of the laser source 22 and the RF power source 30, with FIG. 2 illustrating the shroud 38 removed from the assembly, and FIG. 3 illustrating the completely assembled laser 20. Interior surfaces of the shroud 38 form a single channel for the passage of the air flow 44 for cooling the laser source 22 and the RF power source 30.

At least one fan 40 is mounted at a rear end 42 of the assembled laser 20, with the fan 40 capable of directing air as a single air flow 44 flowing about the laser source 22 and the RF power source 30, and flowing within the channel formed by the shroud 38, with the air being obtained from slots (not shown) extending through shroud 38 into the assembled laser 20. The slots are preferably located in a front end 48 of the laser 20 and/or of the shroud 38 at a front end of the assembled laser 20, as shown, such that the directed air flow 44 passes first substantially adjacent to the cooling fins 28 of the laser source 22, thereby cooling the laser source 22, and causing an increase in temperature of the air flow 44. Alternative locations of the slots generally in the front end portion of the shroud 38 are also contemplated.

The air flow 44 then passes substantially adjacent to the cooling fins 32 of the RF power source 30 to cool the RF power source 30. According to the present invention, it has been determined that, although the RF power source 30 is cooled by air flow which has been heated by the laser source 22, despite such increased temperature of the air flow 44, it is still satisfactory to adequately cool the RF power source 30.

After passing substantially adjacent to the cooling fins 32, the air flow 44 passes out of the rear end of the laser 20 through and out of the fan 40. By reversing the rotation of the fan 40, the direction of the air flow 44 may be reversed. However, in the preferred embodiment, the air flow 44 passes substantially adjacent to and cools the laser source 22 first before passing substantially adjacent to and cooling the RF power source 30.

In another embodiment, high pressure vacuum blowers, for example, as described in commonly assigned U.S. patent application Ser. No. 10/463,105, may also be used in addition to or in lieu of the fan 40. U.S. patent application Ser. No. 10/463,105 is incorporated herein by reference and is made a part of the present application.

Figure 5:
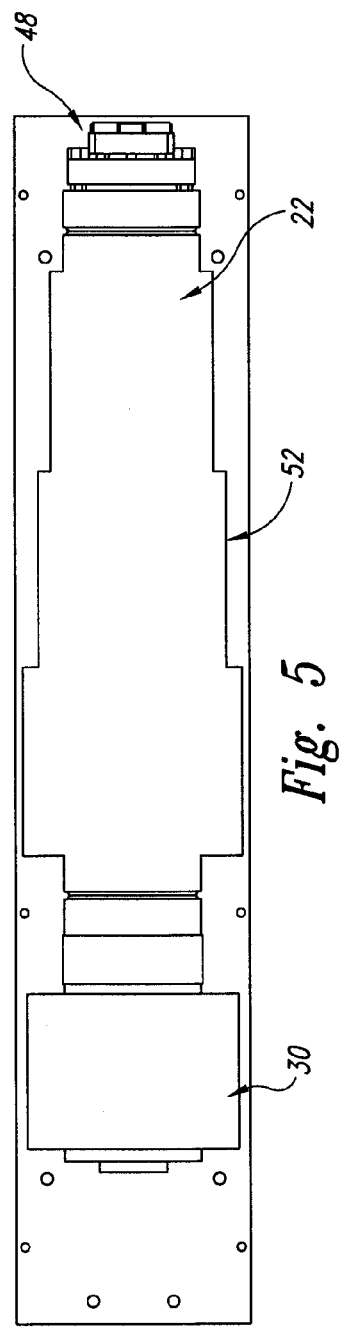
FIG. 5 is a top plan view of an alternative embodiment of the laser of FIG. 2 with the shroud removed, showing a second method of profiling the cooling fins of the laser source.
Figure 6:
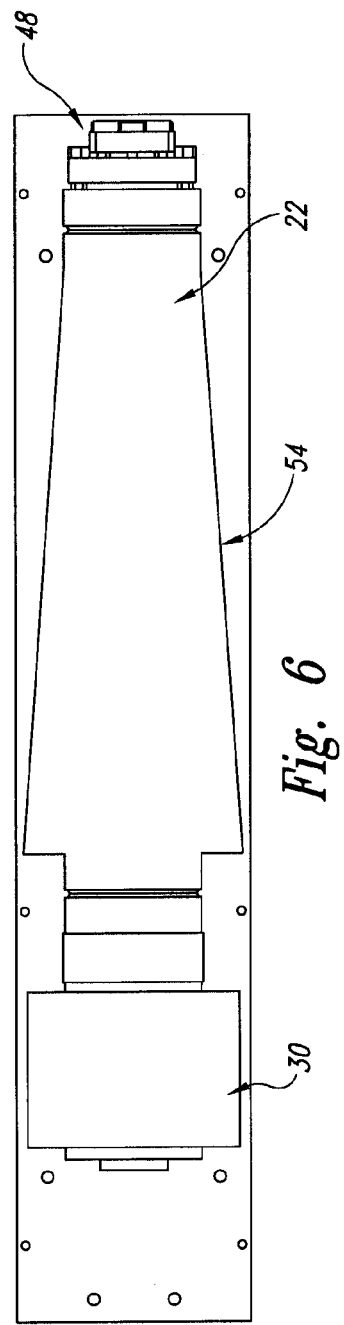
FIG. 6 is a top plan view of another alternative embodiment of the laser of FIG. 2 with the shroud removed, showing a third method of profiling the cooling fins of the laser source.

As mentioned an important aspect of this invention is the symmetric cooling of the laser source 22 by a cross-section perpendicular to the air flow 44 which prevents twisting and bowing of the laser source which can cause optical misalignment of the resonator. A further enhancement to this invention can be achieved by profiling the cooling fins 28 of the laser source 22 in the direction of the air flow 44, as shown in FIGS. 5-6, so that the efficiency of the cooling fins 28 is reduced at the front end 48 of the laser 20 and/or the shroud 38 where ambient air enters the cooling passages and increases along the length of the laser 20. This increase in cooling efficiency will offset the increase in temperature of the cooling air so the temperature differential of the laser source 22 along its length can be reduced or eliminated.

Figure 7:
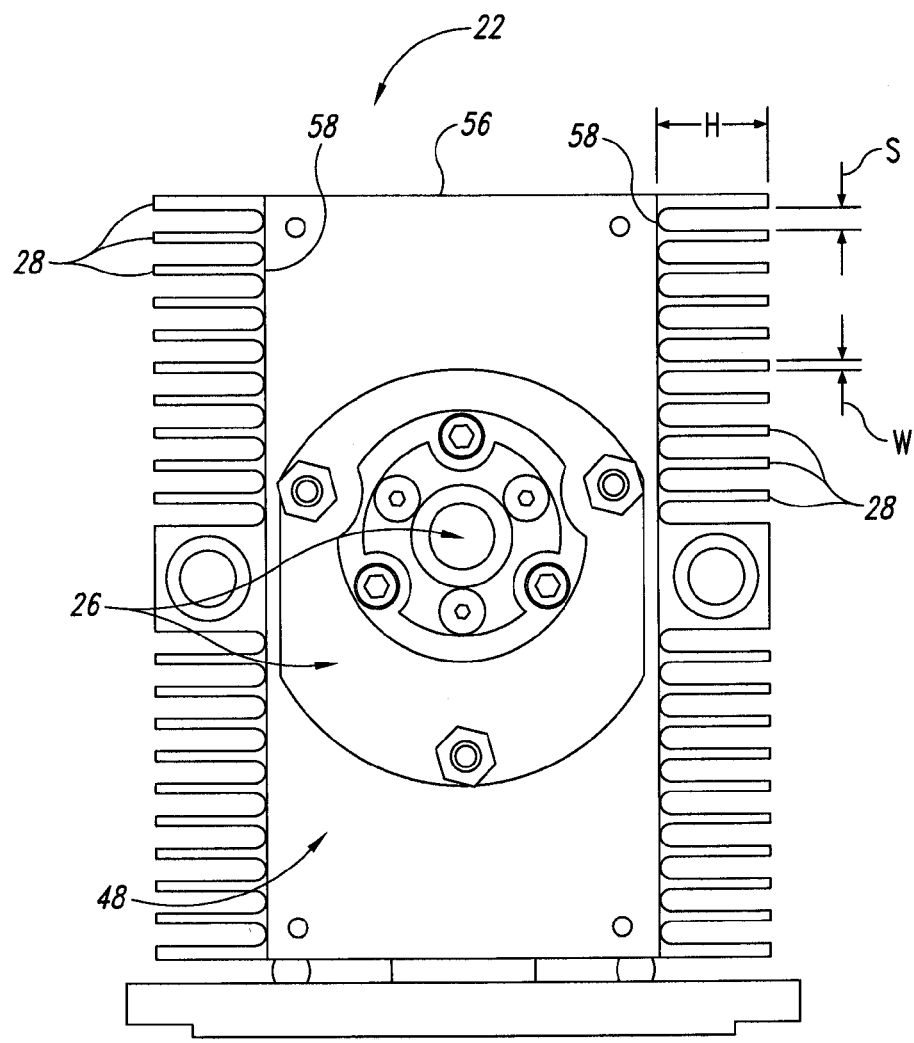
FIG. 7 is a front elevational view of the laser source with the shroud removed, along lines 7-7 in FIG. 2.

The cooling fins 28 which form the heat sink are shown in greater detail in FIG. 7, which is a front elevational view of the front end 48 of the laser 20 along lines 7-7 in FIG. 2. The optical elements 26 including resonator optics extend from the front end 48 and are mounted within a housing 56. The cooling fins 28 are substantially developed surfaces; that is, the fins 28 have a relatively large surface area for performing as a heat sink to dissipate heat into the ambient air.

The cooling fins 28 extend from an external surface 58 of the housing 56 of the laser source 22, with the cooling fins 28 having a predetermined fin height H, a predetermined fin width W, and a predetermined fin spacing S.

FIG. 4 illustrates a top plan view of the invention, in which the cooling fins 28, 32 of the laser source 22 and the RF power source 30 are respective portions of a substantially developed surface of the outer portion of the laser source 22 and RF power source 30, respectively, to facilitate the transfer of heat from the laser source 22 or RF power source 30 to the surrounding air.

FIGS. 5-6 illustrate two possible alternative embodiments of cooling fins providing different profiling geometries with increasing cooling efficiency away from the front end 48 of the laser 20 and/or the shroud 38. As shown in the top plan view in FIG. 5, cooling fins 52 in a first alternative embodiment provide a stepped profile, in which the height H of the cooling fins 52 increases away from the front end 48 in two or more stepped sections. As shown the top plan view in FIG. 6, cooling fins 54 in a second alternative embodiment provide a continuous tapering profile, in which the height H of the cooling fins 54 increases away from the front end 48. Other geometries are also contemplated, including curved tapered profiles.

While the invention has been shown and described with respect to preferred embodiments, it will be understood by those skilled in the art that various modification and changes may be made therein without departing from the spirit and scope of the invention.

What is claimed is:

1. A laser, comprising:
   a laser source;
   a power source for causing the laser source to generate a laser beam, wherein the power source is configured to provide excitation energy for a lasing medium;
   a fan for generating an air flow;
   wherein the laser source and the power source each have an exterior surface; and
   wherein the laser source and the power source are arranged in an end-to-end series relation along a longitudinal axis such that the fan directs the air flow generally parallel with the longitudinal axis to pass first adjacent to the exterior surface of the laser source for the cooling thereof, and then to pass adjacent to the exterior surface of the power source for subsequent cooling thereof.

2. The laser of claim 1, wherein each of the exterior surfaces of said laser source and said power source includes:
   a substantially developed surface to facilitate transfer of heat to air, wherein the fan directs the air flow substantially adjacent to the developed surface of each of said laser source and said power source.

3. The laser of claim 2, wherein said developed surfaces are cooling fins.

4. The laser of claim 3, wherein said cooling fins on said laser source are profiled in a direction along the longitudinal axis of the laser.

5. The laser of claim 1, wherein said laser source and said power source have generally equal cross-sectional areas in a direction perpendicular to the longitudinal axis.

6. The laser of claim 1, further comprising:
   a shroud covering said laser source and said power source, wherein said shroud includes interior walls forming a single air channel configured to direct the air flow within the shroud in a single direction from the fan along the longitudinal axis to pass substantially adjacent to the exterior surfaces of said laser source and said power source.

7. A laser, comprising:
   a laser source having a first end, a second end spaced apart from a first end along a longitudinal axis, a laser resonator, a laser media, and electrodes for exciting the laser media;
   a power source at least proximate to one of the first or second ends of said laser source and configured to provide excitation energy to the electrodes and cause the laser source to generate a laser beam from the other one of the first or second ends, wherein the power source and the laser source are aligned along the longitudinal axis; and
   a cooling fan positioned adjacent to said power source and located in a generally straight line path with said laser source and said power source along the longitudinal axis, said cooling fan adapted for generating an air flow for cooling said laser source and said power source.

8. The laser of claim 7, wherein said cooling fan generates the air flow in a direction to cool said laser source before cooling said power source.

9. The laser of claim 7, wherein said cooling fan generates the air flow in a direction to cool said power source before cooling said laser source.

10. The laser of claim 7, wherein each of said laser source and said power source includes:
    a substantially developed surface to facilitate a transfer of heat to air on a respective exterior surface, and
    wherein said cooling fan directs the air flow substantially adjacent to the developed surface of each of said laser source and said power source.

11. The laser of claim 10, wherein said developed surfaces are cooling fins.

12. The laser of claim 11, wherein said cooling fins on said laser source are profiled in a direction along the longitudinal axis of the laser.

13. The laser of claim 7, wherein said laser source and said power source have generally equal cross-sectional areas in a direction perpendicular to the generally straight line path.

14. The laser of claim 7, further comprising:
    a shroud for covering said laser source and said power source, with said shroud forming a single air channel for directing the air flow along the generally straight line path to pass substantially adjacent said laser source and said power source.

15. A laser, comprising: a laser source; a power source at least proximate to said laser source and configured to provide excitation energy for a lasing medium of the laser source to generate a laser beam; wherein the laser source and the power source are arranged in an end-to-end series relation along a longitudinal axis and a cooling fan at one end of the power source, the cooling fan being adapted for generating an air flow directed in a generally straight line path with said laser source and said power source for cooling said laser source and said power source.

16. The laser of claim 15, wherein said cooling fan generates the air flow in a direction to cool said laser source before cooling said power source.

17. The laser of claim 15, wherein said cooling fan generates the air flow in a direction to cool said power source before cooling said laser source.

18. The laser of claim 15, wherein each of said laser source and said power source includes:
    a substantially developed surface to facilitate transfer of heat to air on a respective exterior surface, and
    wherein said cooling fan directs the air flow substantially adjacent to the developed surface of each of said laser source and said power source.

19. The laser of claim 18, wherein said developed surfaces are cooling fins.

20. The laser of claim 19, wherein said cooling fins on said laser source are profiled in a direction along the longitudinal axis of the laser.

21. The laser of claim 15, wherein said laser source and said power source have generally equal cross-sectional areas in a direction perpendicular to the generally straight line path.

22. The laser of claim 15, further comprising:
    a shroud for covering said laser source and said power source, with said shroud forming a single air channel for directing the air flow along the generally straight line path to pass substantially adjacent said laser source and said power source.

23. A laser, comprising:
- a laser source having a first end, a second end spaced apart from a first end along a longitudinal axis, a laser resonator, a laser media, and electrodes for exciting the laser media;
- a power source at least proximate to one of the first or second ends of the laser source and configured to provide excitation energy to the electrodes and cause the laser source to generate a laser beam, wherein the power source and the laser source are aligned along the longitudinal axis; and
- a cooling fan positioned adjacent to the power source and in a generally straight line path with the laser source and the power source along the longitudinal axis, wherein the cooling fan is adapted for generating an air flow for cooling the laser source and the power source.

* * * * *